Aug. 26, 1924.

A. D. MACFARLANE 1,506,022

LIGHT FOR AUTOMOBILES

Filed Oct. 27, 1922

INVENTOR
Angus D. Macfarlane,
by
Arthur B. Jenkins,
ATTORNEY

Patented Aug. 26, 1924.

1,506,022

UNITED STATES PATENT OFFICE.

ANGUS D. MACFARLANE, OF HARTFORD, CONNECTICUT.

LIGHT FOR AUTOMOBILES.

Application filed October 27, 1922. Serial No. 597,338.

*To all whom it may concern:*

Be it known that I, ANGUS D. MACFARLANE, a citizen of the United States, and a resident of Hartford, in the county of Hartford and State of Connecticut, have invented new and Improved Lights for Automobiles, of which the following is a specification.

My invention relates to the class of devices employed for illumination purposes in connection with automobiles, and an object of my invention, among others, is to provide a light so arranged that the objects incident to the glare of head lights shall be greatly relieved.

One form of device embodying my invention and in the construction and use of which the objects herein set out, as well as others, may be attained, is illustrated in the accompanying drawings, in which—

Figure 1:
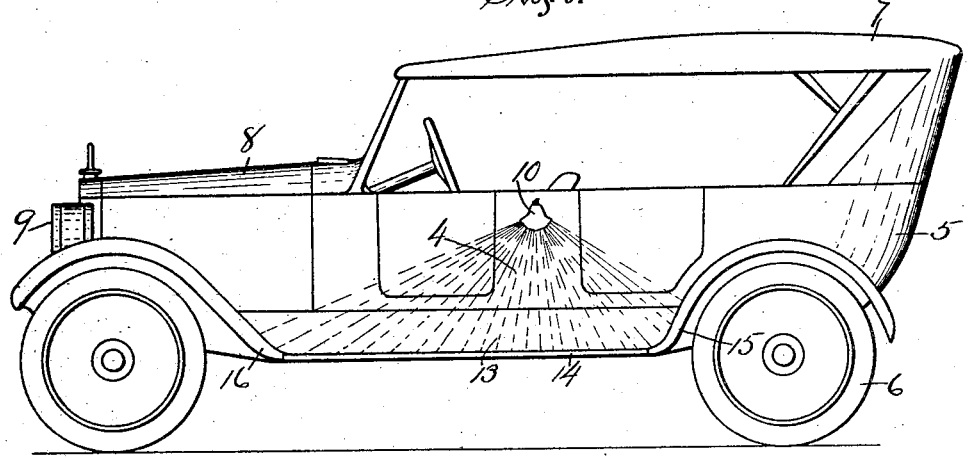
Figure 1 is a view in side elevation of an automobile provided with my improved illuminating device.

Much difficulty has been experienced in connection with automobiles in efforts to provide devices for lighting the road that shall not be objectionable to the drivers of vehicles approaching in an opposite direction, and while such objections have been lessened to some extent, the need for improvement is still great owing to the inability of the drivers of approaching vehicles to see beyond that surface of the roadway illuminated by the lamps of other vehicles. That is, it is impossible for the drivers of vehicles to plainly distinguish objects at the sides of or back of approaching vehicles. By the use of my improved lighting arrangement illustrated and described herein I have provided means whereby these objections are removed and the vehicle is illuminated along its side surface, and this lighting may be extended to the roadway at the side of said vehicle so that the exact location of said vehicle may be noted and objects of its side may be plainly discerned, such structure being shown in the accompanying drawings in which the numeral 5 denotes the body of an automobile, 6 the wheels thereof, 7 the top, 8 the hood, and 9 the front or head lights, all of which parts may be of any ordinary and well known construction, and for which reason further and detailed description is omitted herein.

In carrying out my invention I attach a lamp casing 10 to the side of the vehicle, preferably midway of its length, this lamp casing being, so far as the lighting part is concerned, of any ordinary and well known construction, as an electric bulb 11.

The casing 10 is provided on its lower side with a number of lenses 12, or other means for permitting the rays of the lamp to shine through them. In the structure shown four of these lenses are employed and they are so arranged as to distribute the rays 13 of light forwardly and backwardly of the lamp and upon the footboard 14, the mud guards 15—16 and against the side 4 of the body, but not to throw the rays of light to the front or rear over the mud guards 15 and 16 as the principal object of this invention is to cast the rays onto the running board 14 between the mud guards and onto the ground adjacent the running board.

By this arrangement the side of the vehicle upon which the lamp is supported is clearly illuminated and this effectually counteracts the glare caused by the head lights 9. The rays of light 13 may be directed laterally sufficiently to illuminate the surface over which the vehicle is traveling.

Figure 2:
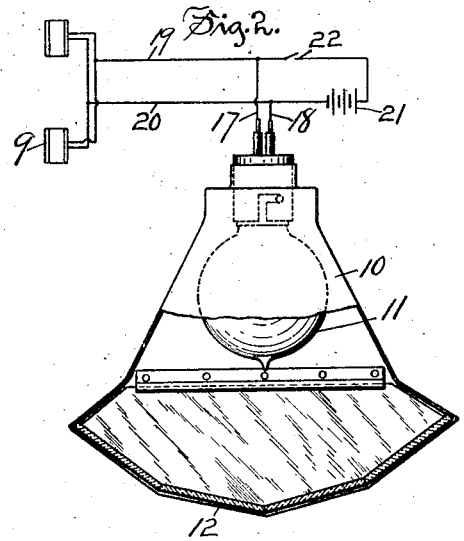
Figure 2 is a view partially in section through my improved lamp and illustrating diagrammatically the arrangement of the wiring thereof.

My improved lighting device constitutes one of the running lights of the vehicle, that is, a light that is used whenever the vehicle is in operation after dark, the other running lights constituting a pair at least of head lights and a tail light. In order to effect this purpose I connect my improved lighting device into the circuit so that whenever the other running lights are illuminated my improved lamp will also be illuminated. This arrangement is shown in Figure 2 in which a pair of head lights only are shown, the tail light being omitted as its arrangement will be readily understood by those skilled in the art. By this arrangement it will be noted that wires 17—18 of my improved lighting device are connected with the main wires 19—20 extending from a battery 21 to the head lights 9, the flow of electricity being controlled as by a switch 22. It will thus be noted that whenever the switch 22 is operated to illuminate the head lights my improved lighting device will be illuminated at the same time and, therefore, whenever the vehicle is illuminated for running purposes my improved device will form a part of such illuminating system.

Figure 3:
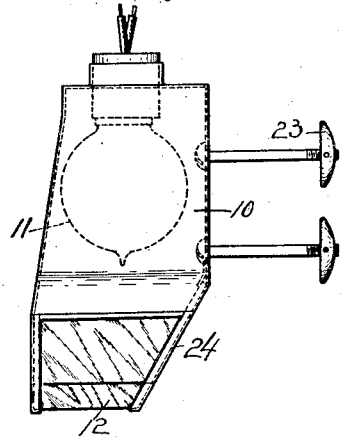
Figure 3 is a view in side elevation of my improved lamp.

In order that the side of the vehicle shall be clearly illuminated the casing 10 may be inclined from the back forwardly and downwardly, as shown at 24 in Figure 3 of the drawings, this inclined portion to be provided with a suitable lens for directing the light rays.

In accordance with the provisions of the patent statutes I have described the principles of operation of my invention, together with the device which I now consider to represent the best embodiment thereof; but I desire to have it understood that the device shown is only illustrative.

I claim—

A lamp attachment for the sides of automobile bodies adapted for casting light rays downwardly, forwardly and rearwardly between the front and rear mud guards of an automobile and comprising a casing, having front and rear walls, downwardly diverging side walls, the rear wall of the casing adjacent the lower end thereof being inclined outwardly for projecting the downwardly projected light rays outwardly of the running board, the casing being open at its lower side and a lens in said opening.

ANGUS D. MACFARLANE.